March 28, 1950     R. IREDELL, JR     2,502,322

SHOCK ABSORBING DEVICE

Filed Dec. 22, 1945     2 Sheets-Sheet 1

INVENTOR.
Robert Iredell Jr.
BY
Evans & McCoy
ATTORNEYS

March 28, 1950      R. IREDELL, JR      2,502,322
SHOCK ABSORBING DEVICE
Filed Dec. 22, 1945      2 Sheets-Sheet 2
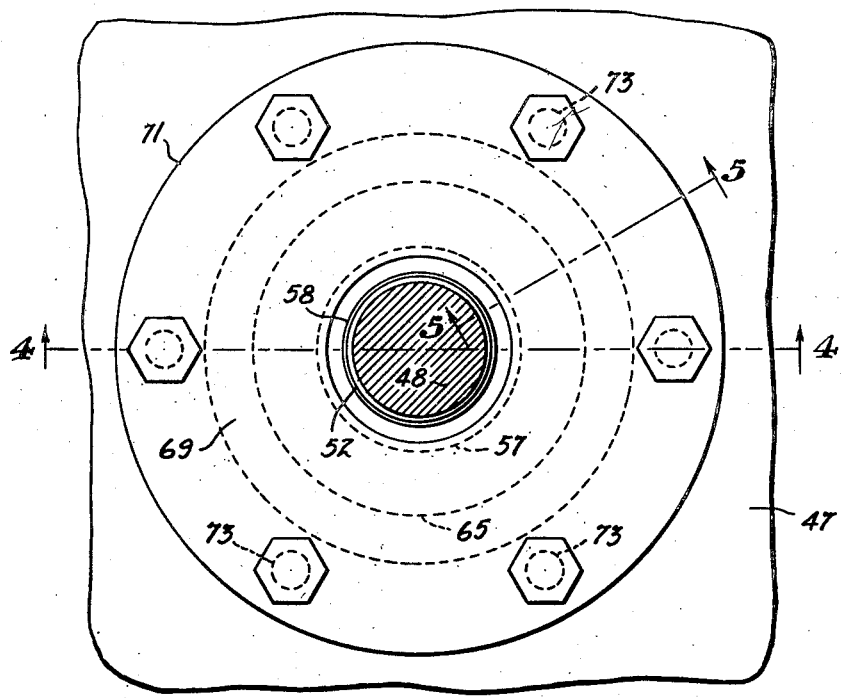
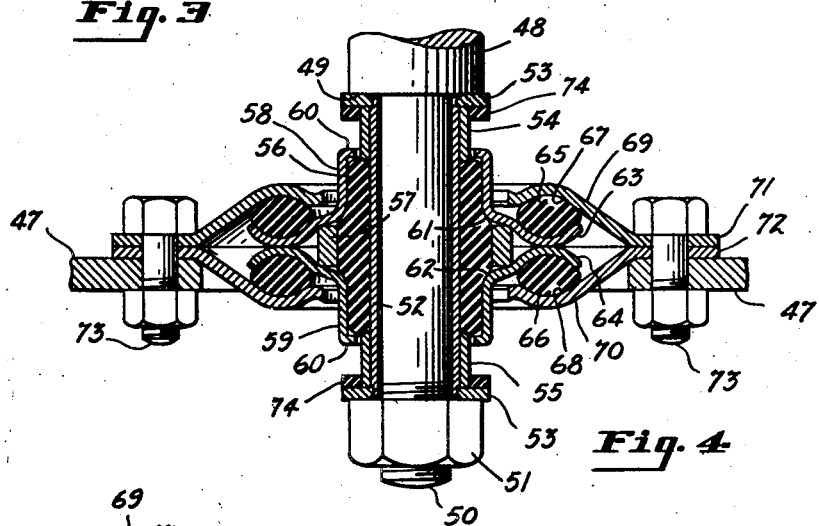
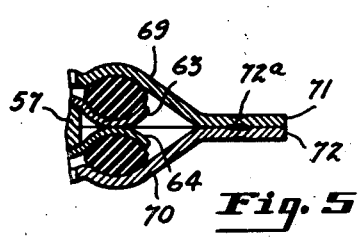
INVENTOR.
Robert Iredell Jr.
BY
Evans & McCoy
ATTORNEYS Patented Mar. 28, 1950

2,502,322

UNITED STATES PATENT OFFICE 2,502,322

SHOCK ABSORBING DEVICE

Robert Iredell, Jr., Wabash, Ind., assignor to The General Tire & Rubber Company, Akron, Ohio, a corporation of Ohio Application December 22, 1945, Serial No. 636,546

8 Claims. (Cl. 248—358)

This invention relates to shock absorbing and vibration damping devices, and is intended for general application between cooperating structures for preventing transmission of shock and vibration from one structure to the other.

More particularly the invention has for an object the provision of a device of this character wherein vibratory movements of one structure with respect to another structure are cushioned, or damped, in a plurality of directions, and cushioning elements employed, such as rubber or synthetic rubber, which are maintained under compression, and relative movements of the vibration transmission means transmitted to the cushioning elements in shear.

Another object of the invention is to provide a plurality of groups of vibration transmitting means, with interposed cushioning elements confined therebetween, and interconnected to effect limited deflection of the cushioning elements at predetermined angles to each other, and wherein the action of one group augments the effect of the other.

A further object of the invention is to provide an assemblage of vibration transmission means, and interposed cushioning elements, and in which a fluid cylinder and piston means are employed for further augmenting the damping effect of the cushioning elements.

A still further object of the invention is to provide a vibration damping device of the character referred to, in which the various parts may be assembled and applied as an operative unit.

Other and further objects of the invention will appear hereinafter from the description embodied in the specification, as set forth in the appended claims, and as illustrated in the accompanying drawings, in which:

Figure 3 is a top plan view, generally similar to Figure 1, and showing a different embodiment of the invention;

Figure 4 is a vertical sectional view of the embodiment shown in Figure 3, taken on a line corresponding substantially to the line 4—4 of Figure 3, while Figure 5 is a framentary vertical sectional view, corresponding substantially to the line 5—5 of Figure 3.

Figure 1:
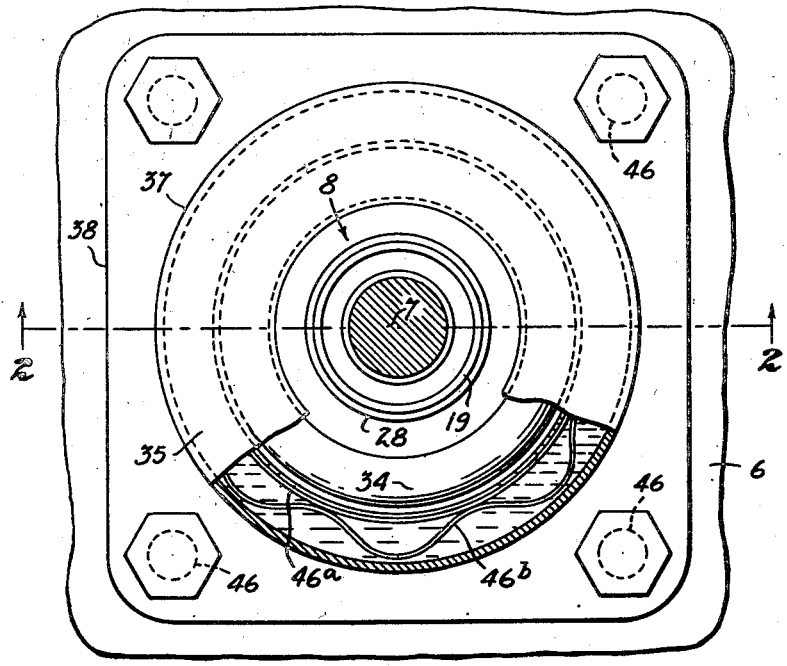
Figure 1 is a top plan view of an embodiment of the invention, showing fragments of the structures to which the invention is applied, and also showing a portion of the invention broken away to better disclose the interior construction thereof.
Figure 2:
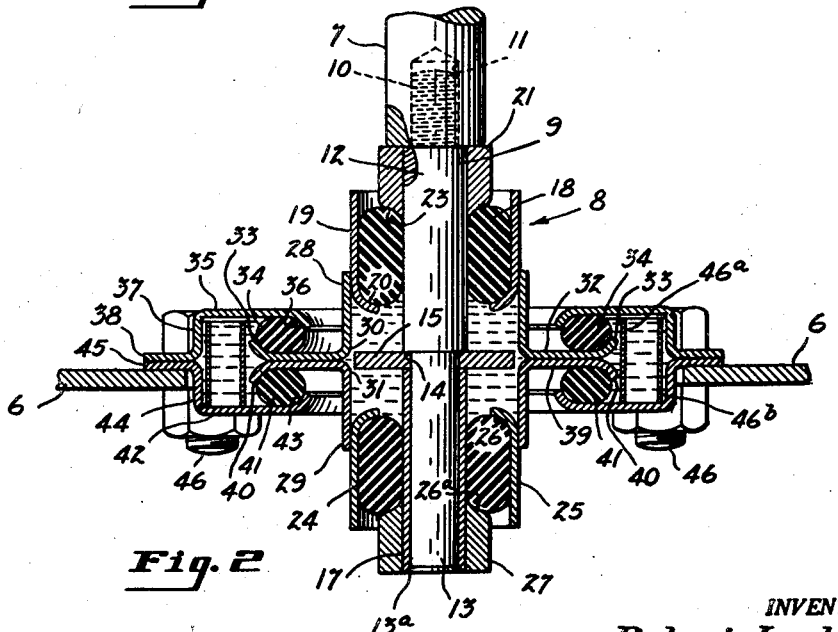
Figure 2 is a vertical sectional view of said embodiment, taken on a line corresponding substantially to the line 2—2 of Figure 1.

Referring to Figures 1 and 2 of the drawings, a supporting structure 6 is shown, which may represent the wall on which is to be supported any vibration producing structure 7, and between which structures is adapted to be interposed the cushioning or damping device, indicated generally by the reference numeral 8.

The damping device 8 comprises a centrally disposed transmission member or post 9, having a stud 10 at one end, adapted to be accommodated in a socket 11 in the structure 7. The post 9, adjacent to the stud 10, has a cylindrical section 12, and beyond the cylindrical section 12, has a reduced cylindrical section 13, a shoulder 14 being provided against which abuts a piston disk 15. A sleeve 17 is disposed about the reduced section 13 to provide a circular section equal in diameter to the section 12 and is fixed to the section 13. The sleeve 17 engages the piston 15 to hold the same against the shoulder 14 and the lower end 13a of the section 13 may be swaged over the lower end of the sleeve 17 to hold it in place. Extending about the section 12 of the post 9 is a cushioning element which preferably takes the form of an annulus of rubber or synthetic rubber 18, held in a highly compressed state between the wall of the section 12 and the encircling wall of a tubular member 19. The tubular member 19 is open at its outer end and at its inner end is formed with an annular seat 20 for seating a portion of the edge of the annulus 18, the seat 20 extending toward the section 12 about the edge of the annulus 18 a distance approximately equal to one-half of the cross-sectional thickness of the annulus 18. Projecting into the open end of the tubular member 19 is a ring-like member 21, of less diameter than the tubular member 19, and secured by a press fit to the section 12. The ring member 21 is provided at its inner end with an annular seat 23 adapted to seat part of the opposite edge portion of the annulus 18, the seat 23 extending from the section 12 toward the wall of the tubular member 19 a distance equal to approximately one-half of the cross-sectional thickness of the annulus 18.

Cooperating with the sleeved section 13 of the post member 9, at the opposite side of the piston disk 15, is an arrangement including a cushioning element in the form of an annulus 24, of rubber or synthetic rubber, held in a compressed state between a tubular member 25 and the sleeve 17, the tubular member 25 having an annular seat 26 engaging the annulus 24, while the opposite edge of the annulus 24 is engaged by an annular seat 26a formed on a ring-like member 27, secured by a press fit to the sleeve 17, the parts 24, 25 and 27, except for their opposite disposition being identical to the parts 18, 19 and 21, already described in detail.

Interposed between the spaced tubular members 19 and 25, and fitted about their exterior surfaces, is a pair of complemental hollow cylindrical members 28 and 29, with their inner extremities 30 and 31 abutting in co-axial relation, the walls of the cylindrical members 28 and 29, together with the adjacent portions of the cushioning elements 18 and 24 and tubular members 19 and 25, defining a cylinder adapted to contain fluid and in which the piston disk 15 operates in the manner of a dash-pot construction.

The inner end 30 of the cylindrical member 28 is provided with a laterally extending annular flange 32, terminating in an outwardly curved annular seat 33, adapted to engage one-half, or somewhat less than one-half, of the outer edge of an annular cushioning element 34, of rubber or synthetic rubber, the remainder of the adjacent parts of the cushioning element bearing against the flange 32. Overlying the cushioning annulus 34 is a circular plate member 35, having an annular seat 36 adapted to engage the opposite approximate one-half of the inner edge of the cushioning element 34, the plate member 35 having an inwardly extending angularly disposed wall 37, terminating in a securing flange 38. The inner end 31 of the cylindrical member 29 is also provided with a laterally extending flange 39, terminating at its outer extremity in an annular seat 40 adapted to engage one-half or less of the outer edge of a cushioning element 41. Underlying the annulus 41 is a circular plate member 42, like the plate member 35, except for its opposite disposition, having an annular seat 43 adapted to engage the opposite inner edge of the annulus 41, the plate 42 having a circular wall 44 terminating in a securing flange 45, the flanges 38 and 45 abutting, and being secured together by suitable means such as by welding.

The circular plates 35 and 42 form a supporting ring having an interiorly facing channel and this ring is attached to the structure 6 by means of bolts 46. The rubber annuli 34 and 41 are held under axial compression between the side walls of the channel and the attached peripheral flanges 32 and 39 and seal the opening of the ring channel to provide an annular chamber in which a body of liquid may be confined to dampen lateral vibrations.

To increase the damping effect of the body of liquid in the ring channel a pair of thin walled rings 46a and 46b are mounted in the channel. The ring 46a is a cylindrical ring of a diameter but slightly greater than the flanges 32 and 39 and the ring 46b is corrugated and has its reentrant corrugations engaging the ring 46a. The width of the rings 46a and 46b is but slightly less than the width of the space between the plates 35 and 42 so that movement of the liquid is impeded.

In operation, vibratory movements, as well as the load imposed thereon by the structure 7, are applied by the post 9, and related parts, to the rubber elements 18 and 24 in shear, and by reason of the compressed state of the elements 18 and 24, elasticity is presented principally in the direction of the long axis of the post 9, or stated in another way, the lines of shear and deflection are normal to the lines of radial compression of the rubber elements. Thus the most effective way of developing the elastic properties of the elements 18 and 24 is effected, the load yieldably sustained, and axial vibration in opposite directions effectually dampened. Damping of axial vibration is augmented by the action of the piston disk 15 upon liquid confined within the cylindrical members 28 and 29. The load imposed upon the vertically acting damping means by the structure 7 is transmitted through the rubber cushioning elements 34 and 41 to the structure 6, the elements 34 and 41 being under vertical compression with the greater elasticity in horizontal directions, and through the medium of the annular seats 33 and 36 and 40 and 43, being horizontally in shear with respect to radial vibrations of the post 9, the damping of vibrations lateral to the axis of the support being augmented by the body of liquid confined in the ring channel.

It will be apparent that through employment of the device described, two groups of cushioning elements are provided, a first group in which the load stresses, the lines of greater elasticity, and the lines of shear lie in the same direction, and an interconnected group of cushioning elements in which the load stresses, the direction of greater elasticity, and the lines of shear lie in the same direction, but substantially at right angles to those of the first group, whereby the attributes of one group are coordinated with the other group, and cooperatively increase the supporting and damping functions.

Referring now to Figures 3, 4 and 5, a somewhat different embodiment of the invention is disclosed. This embodiment is intended to be interposed between a supporting structure 47 and a supported structure 48, the latter having a shoulder 49, and a relatively long stud 50, threaded at its end for the reception of a clamping nut 51. In this embodiment the damping unit is adapted to be clamped between the shoulder 49 and nut 51, and includes a sleeve 52, of greater internal diameter than the external diameter of the stud or post 50, which is grooved at its opposite ends for the reception of collars or rings 53, adapted to be engaged by the shoulder 49 and nut 51 respectively. The collars 52 and 53 provide flanges for retaining spaced rings 54 and 55, the inner ends of which are contoured to engage opposite ends of a band of rubber or synthetic rubber, indicated at 56. The opposite end or edge portions of the band or tube 56 are rounded, and intermediate the ends of the band 56 the band is thickened, and the thickened portion encircled by a ring 57 between which and the adjacent wall of the sleeve 52 the rubber band is compressed. Tubular members 58 and 59 are provided to enclose the portions of the rubber band 56 at each side of the thickened portion thereof, the tubular members at their outer ends having flanges 60 for engaging opposite ends of the band 56, at their inner ends portions being offset to provide seats 61 and 62 for accommodating the ring 57, which operates to hold the tubular members in proper position. Beyond the seats 61 and 62 the tubular members 58 and 59 are provided with oppositely disposed annular seats 63 and 64 for the reception of cushioning elements 65 and 66, which are annular in form. Opposed to the seats 63 and 64 are seating portions 67 and 68, which accommodate the opposite contours of the cushioning elements 65 and 66, the seating portions 67 and 68 forming part of complemental plate members 69 and 70, the latter having marginal flanges 71 and 72 secured together by suitable means such as welding as indicated at 72a in Figure 5, to form a supporting ring having an interiorly facing channel within which the annular cushioning elements 65 and 66 are held under axial compression. The supporting ring is attached to the supporting structure 47 by means of bolts 73.

Suitable bumper pads of elastic rubber 74 may be secured to the inner faces of the rings 53 to limit the axial movements of the stud 50 with respect to the tubular casing formed by the members 58 and 59.

In this construction the cushioning elements 56, 65 and 66, and associated structures, are arranged so that maximum elasticity, lines of shear and load stresses are presented in the manner already explained in connection with the embodiment shown in Figures 1 and 2, and with similar results.

It will be apparent to those skilled in the art that I have accomplished at least the principal objects of my invention and that the embodiments herein described may be variously changed and modified without departing from the spirit of the invention, and that the invention is capable of uses and has advantages not herein specifically described; hence it will be appreciated that the herein disclosed embodiments are illustrative only and that my invention is not limited thereto.

What I claim is:

1. A cushioning device adapted for use between two structures, comprising a post having bearing relation with one of said structures, tubular means disposed about said post, said tubular means and said post being relatively movable axially of said tubular means, cushioning means held within said tubular means, engaging means carried by said tubular means and said post for engaging said cushioning means, annular supporting means carried by and disposed about said tubular means, annular plate means disposed in bearing relation with said second structure, said annular supporting means and said annular plate means being relatively movable in a direction at an angle to the axis of said tubular means, and a second cushioning means disposed between said annular supporting means and said annular plate.

2. A cushioning device adapted for use between two structures, comprising a post adapted to be disposed in bearing relation with one of said structures, tubular means spaced from and surrounding said post, a pair of spaced cushioning annuli compressed between said post and said tubular means, said post and said tubular means having offset engaging means engageable with said annuli to resist relative axial movement therebetween in opposite directions, annular supporting means carried by said tubular means and extending therefrom at an angle substantially normal to said tubular means, a pair of cushioning annuli, one disposed upon each side of said supporting means, and a pair of annular plates enclosing said cushioning annuli and adapted to be disposed in bearing relation with said other structure, said plates and said supporting means being relatively movable at an angle to said direction of axial movement and having offset engaging means for engaging said cushioning annuli.

3. A cushioning device for use between two structures, comprising a post fixed to one of said structures and movable therewith, a tubular band of cushioning material on said post, tubular means surrounding the post and confining said band under radial compression, said tubular means and said post being relatively movable axially, said tubular means having angularly disposed extensions annular in form, annular cushioning means disposed at opposite sides of said annular extensions, and annular plates enclosing said annular cushioning means and disposed in bearing relation with respect to said other structure, said annular extensions and said annular plates being movable relatively at an angle to the axis of said tubular means and post, and having engaging means engageable with said annular cushioning means.

4. A cushioning device for use between two structures comprising a post attached to one of the structures, a ring attached to the other of the structures and surrounding the post, rubber cushioning annuli of different diameters surrounding the post, the smaller of said annuli engaging said post and the larger engaging said ring, and a sleeve surrounding the smaller of said annuli and within the larger, said sleeve engaging the smaller of the annuli at points spaced radially outwardly of the post to impose axial thrusts in shear upon the smaller of said annuli, said sleeve having an outwardly projecting portion engaging the larger of the annuli at points spaced axially with respect to points of engagement of the larger of the annuli with said ring to impose thrusts in directions laterally of the axis in shear upon the larger of said annuli.

5. A cushioning device for use between two structures comprising a post attached to one of the structures, a ring attached to the other of the structures and surrounding the post, said ring having an interiorly facing channel, a rubber cushioning annulus surrounding the post, a sleeve enclosing said annulus and having a peripheral projecting portion extending into said channel, thrust shoulders on said sleeve and post for imposing axial thrusts in shear upon said rubber annulus, rubber cushioning elements interposed between the walls of the ring channel and the projecting portion of the sleeve, and thrust shoulders on said ring and projecting portion for imposing thrusts transverse to the axis in shear upon said cushioning elements.

6. A cushioning device for use between two structures comprising a post attached to one of the structures, a ring attached to the other of the structures and surrounding the post, said ring having an interiorly facing channel, a sleeve surrounding the post and having a peripheral flange extending into said ring channel, a rubber annulus under radial compression between said post and sleeve and rubber annuli under axial compression between said flange and the walls of the ring channel.

7. A cushioning device for use between two structures comprising a post attached to one of the structures, a ring surrounding the post and attached to the other of the structures, said ring having an inwardly facing channel, a sleeve surrounding the post and having a peripheral flange extending into said ring channel, two axially spaced rubber annuli under radial compression between said sleeve and post, said sleeve post and rubber annuli forming a chamber for liquid, a piston attached to the post within said liquid chamber, and rubber annuli under axial compression between said flange and the walls of the ring channel, the latter annuli sealing the channel opening and providing a chamber for a vibration damping body of liquid.

8. A cushioning device for use between two structures comprising a post attached to one of the structures, a ring attached to the other of the structures and surrounding the post, said ring having an interiorly facing channel, a sleeve surrounding the post and having a peripheral flange extending into said ring channel, rubber annuli under axial compression between the said flange and the walls of the ring channel and sealing the channel to provide a liquid chamber, and means in said chamber for impeding movements of the liquid in the chamber comprising a ring of corrugated peripheral form and of a width but slightly less than the axial depth of the chamber.

ROBERT IREDELL, Jr.

REFERENCES CITED

The following references are of record in the file of this patent:

UNITED STATES PATENTS

| Number | Name | Date |
|---|---|---|
| 2,179,959 | Schroedter | Nov. 14, 1939 |
| 2,387,065 | Harding | Oct. 16, 1945 |
| 2,407,588 | Thiry | Sept. 10, 1946 |
| 2,417,096 | Thiry | Mar. 11, 1947 |